United States Patent
Atwater

[15] 3,664,513
[45] May 23, 1972

[54] STORAGE FRAME COMPONENTS AND ASSEMBLY THEREOF INTO A STORAGE RACK FOR USE IN AUTOMATIC WAREHOUSING SYSTEMS

[72] Inventor: Wayne G. Atwater, Willoughby, Ohio
[73] Assignee: The Triax Company, Cleveland, Ohio
[22] Filed: July 20, 1970
[21] Appl. No.: 56,269

[52] U.S. Cl. ............................................. 211/134, 52/655
[51] Int. Cl. ............................................................ A47f 5/00
[58] Field of Search ............... 211/134, 148 R, 148 B, 148 A, 211/177, 182, 176; 52/646, 645, 643, 637, 648, 655, 633, 693; 287/189.36 R, 189.35, 189.36 F; 248/235, 250

[56] References Cited

UNITED STATES PATENTS

| | | | |
|---|---|---|---|
| 3,337,061 | 8/1967 | Caudell | 211/134 |
| 2,326,783 | 8/1943 | Kautz | 248/235 |
| 1,662,766 | 3/1928 | Wait | 287/189.36 R |
| 2,107,660 | 2/1938 | Cichocki | 108/108 |
| 3,365,073 | 1/1968 | Degener | 211/176 |
| 2,155,709 | 4/1939 | Patterson | 287/189.35 X |
| 2,711,138 | 6/1955 | Hart | 287/189.35 X |

*Primary Examiner*—Ramon S. Britts
*Attorney*—Baldwin, Egan, Walling & Fetzer

[57] ABSTRACT

A storage framework composed of a plurality of storage frame elements or components assembled into a storage rack for use in an automatic warehousing system. The framework comprises generally parallel rows of vertical columns with each of the columns comprising in certain embodiments a pair of channel-like members with the cross webs thereof disposed in spaced back-to-back relation. Load carrying members are spaced vertically along the columns and define the storage volumes in the storage rack. The load carrying members each comprise a portion disposed in sandwiched relation between the respective pair of channel-like members and means extending between each of the load carrying members and the channel-like members of the columns for connecting the latter together. The components are adapted to be shipped to the location of use and assembled there. The arrangement facilitates the fabrication, preparation, and handling of the storage rack components and also facilitates their assembly at the location of use. Other embodiments provide a double K-like load support arrangement tying outer and aisle columns together, with the latter comprising single channel-like members.

23 Claims, 17 Drawing Figures

INVENTOR
WAYNE G. ATWATER
BY
Baldwin, Egan, Walling & Fetzer
ATTORNEYS

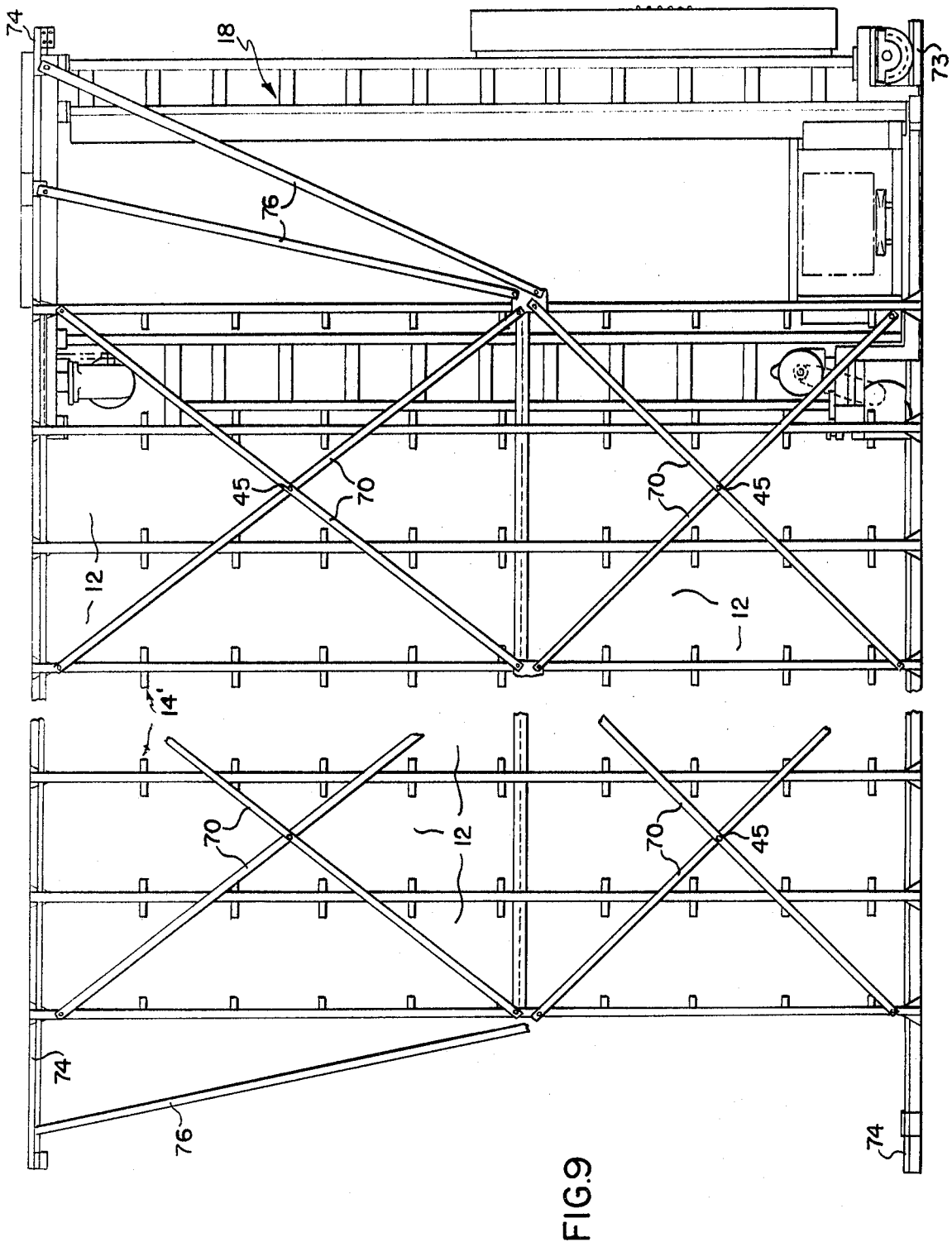

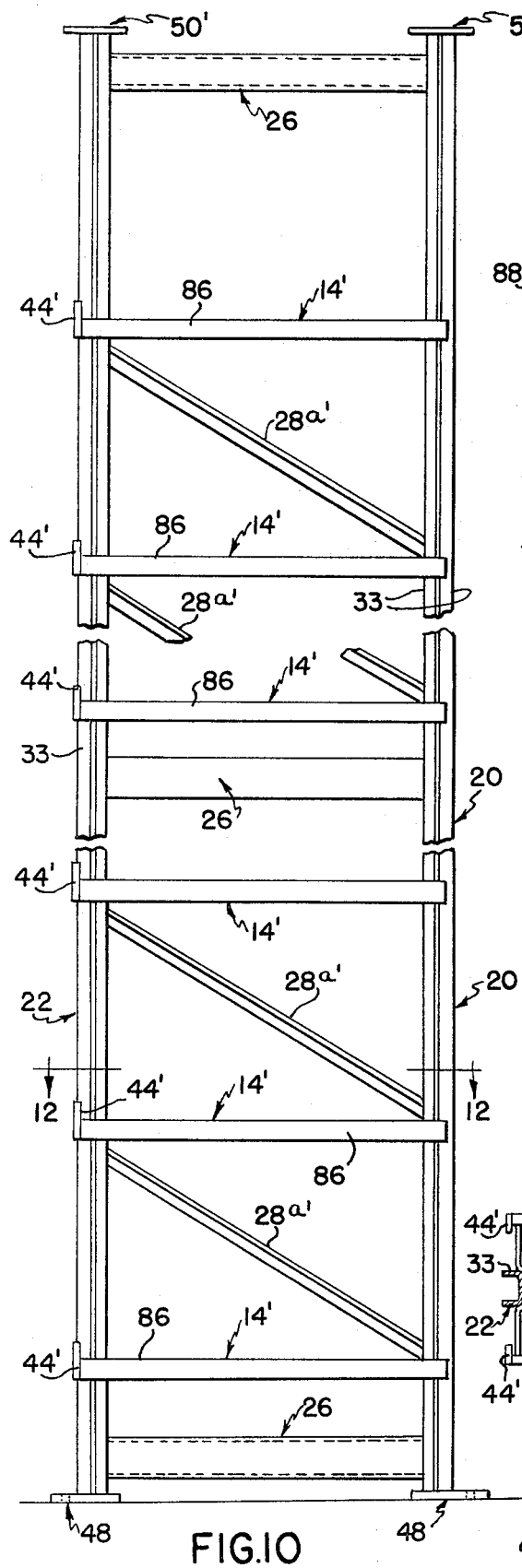
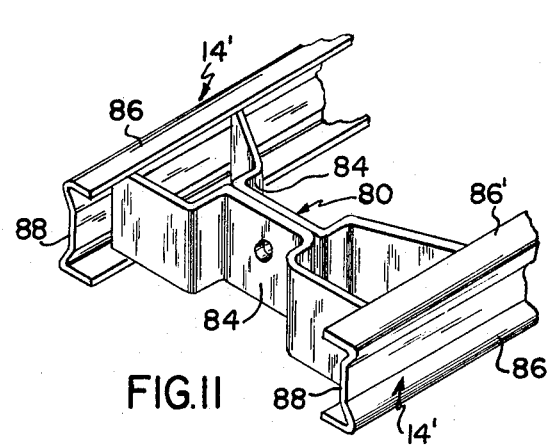
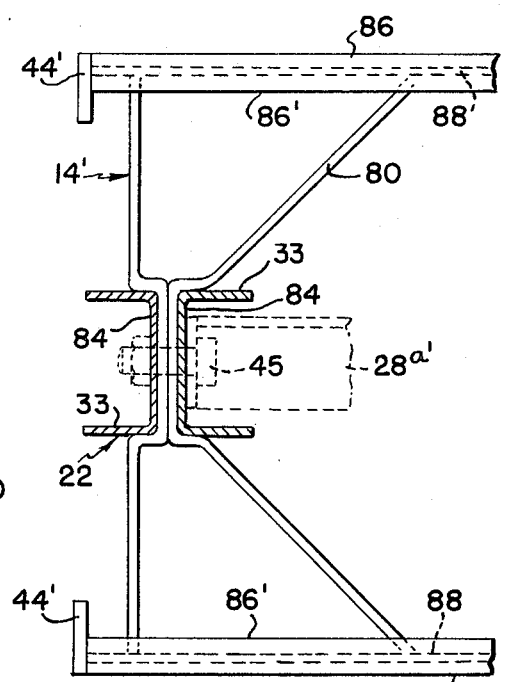
FIG.10  FIG.11  FIG.12  FIG.13
INVENTOR
WAYNE G. ATWATER INVENTOR.
WAYNE G. ATWATER
BY
Baldwin, Egan, Walling & Fetzer
ATTORNEYS 3,664,513

STORAGE FRAME COMPONENTS AND ASSEMBLY THEREOF INTO A STORAGE RACK FOR USE IN AUTOMATIC WAREHOUSING SYSTEMS

This invention relates to structural components for use in a storage rack for an automatic warehousing system and wherein the storage rack comprises a plurality of columns of novel construction which increase the strength and rigidity of the storage rack structure and wherein the various components of the storage rack are so constructed and arranged that they can be readily shipped to a location of use, and can be assembled on site. This materially reduces the costs of fabrication and shipping of the storage rack structure.

BACKGROUND OF THE INVENTION

Heretofore it has been conventional to fabricate storage rack sections for an automatic warehousing system and ship these fabricated sections called "ladders" to the site where they would be assembled. Factory fabrication of the "ladders" becomes increasingly difficult as the sizes of the "ladders" increase due to larger warehousing systems. Variations in sizes from one job to the next make efficient tooling for production of the "ladders" prohibitive and the costs of handling and manufacturing high. Moreover, shipping of the fabricated ladders for rack construction to the site of use is costly, necessitating individual handling and much wasted space in the conveying vehicles (railway cars, trucks or the like).

SUMMARY OF THE INVENTION

The present invention provides various structural components for forming the storage racks of automatic warehousing systems and wherein the components are substantially linear in configuration, making them adaptable to "line" fabrication, cleaning and painting, and making possible handling of the components in bundles for compact shipment. Moreover, the components are such that they can be readily assembled at the location of use, and the construction of the columns and load supporting members of the storage structure are such that they materially increase the rigidity and overall strength of the storage racking. The rack components cost less to fabricate at the factory, to ship to the site of use, to handle while fabrication and shipping is going on, and make it possible to utilize a considerable portion of standardized parts for different sizes of warehousing storage structures.

Accordingly, an object of the invention is to provide a novel storage framework or rack for warehousing systems.

Another object of the invention is to provide a framework of the latter type which can be readily assembled on site, and wherein the components for constructing the warehousing racking are of a generally linear type greatly facilitating their handling during manufacturing and shipping thereof to the site of use.

A still further object of the invention is to provide a storage framework of the above type wherein the components utilized in the construction of the racking can be standardized for use in different sizes of warehousing systems, thereby making it possible to more economically produce and construct storage racking for warehousing systems.

Another object of the invention is to provide a storage framework of the aforementioned type wherein the column components thereof are adapted to be assembled on site from linear components shipped to the site in compact bundles, and wherein such columns each comprise a pair of spaced channel-like members connected together and having load carrying members connected to the channel-like members, with the load carrying members having portions received in sandwiched relation between the respective pair of channel-like members.

Another object of the invention is to provide a storage framework utilizing K-like load support arrangements connecting column components together and extending for substantially the full depth of the respective storage volume, and wherein the column components comprise single channel-like members.

A still further object of the invention is to provide a more economical arrangement for the production of components for automatic warehousing racking, and for reducing the cost of handling such components and shipping the latter to the site of use where they are adapted for assembly into a completed automatic warehousing storage rack.

Other objects and advantages of the invention will be apparent from the following description taken in conjunction with the accompanying drawings, wherein:

FIG. 9 is an enlarged, side elevational, broken view generally similar to that of FIG. 8 but illustrating the load carrier positioned at the forward end of the storage rack assembly preparatory to movement into the travel zone for handling a load (or loads) in the storage rack;

FIG. 10 is an enlarged, side elevational view of a ladder assembly for a storage rack which embodies a modified K-type load support form as compared to that of the FIGS. 1 and 2 arrangement;

FIG. 11 is a broken, perspective illustration of the load carrying member of the FIG. 10 ladder assembly;

FIG. 12 is a reduced size, broken, top plan view taken generally along the plane of line 12—12 of FIG. 10, looking in the direction of the arrows and illustrating the load carrying member assembly as attached to the columns of the storage rack;

FIG. 13 is an enlarged, fragmentary plan view showing in detail the attachment of the rearward end of the load carrying member assembly to an associated column of the storage rack.

DESCRIPTION OF THE PREFERRED EMBODIMENTS

Figure 1:
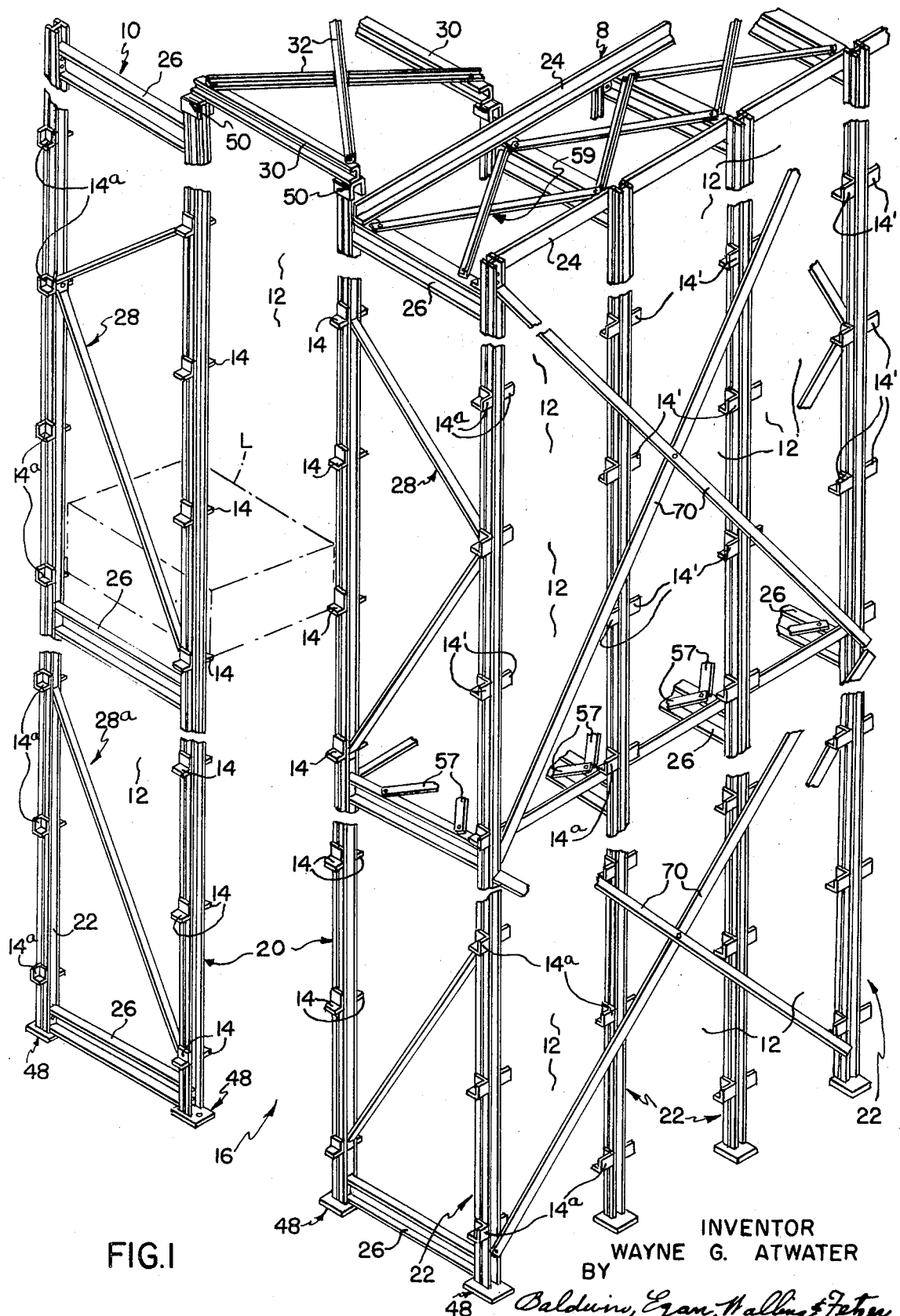
FIG. 1 is a fragmentary, broken, perspective illustration of a storage rack assembly of the invention and illustrating a central aisle or travel zone along which an automatic load handling load carrier is adapted to move with a storage rack being disposed on opposite sides of the aisle for storing loads to either side of the load carriers.
Figure 2:
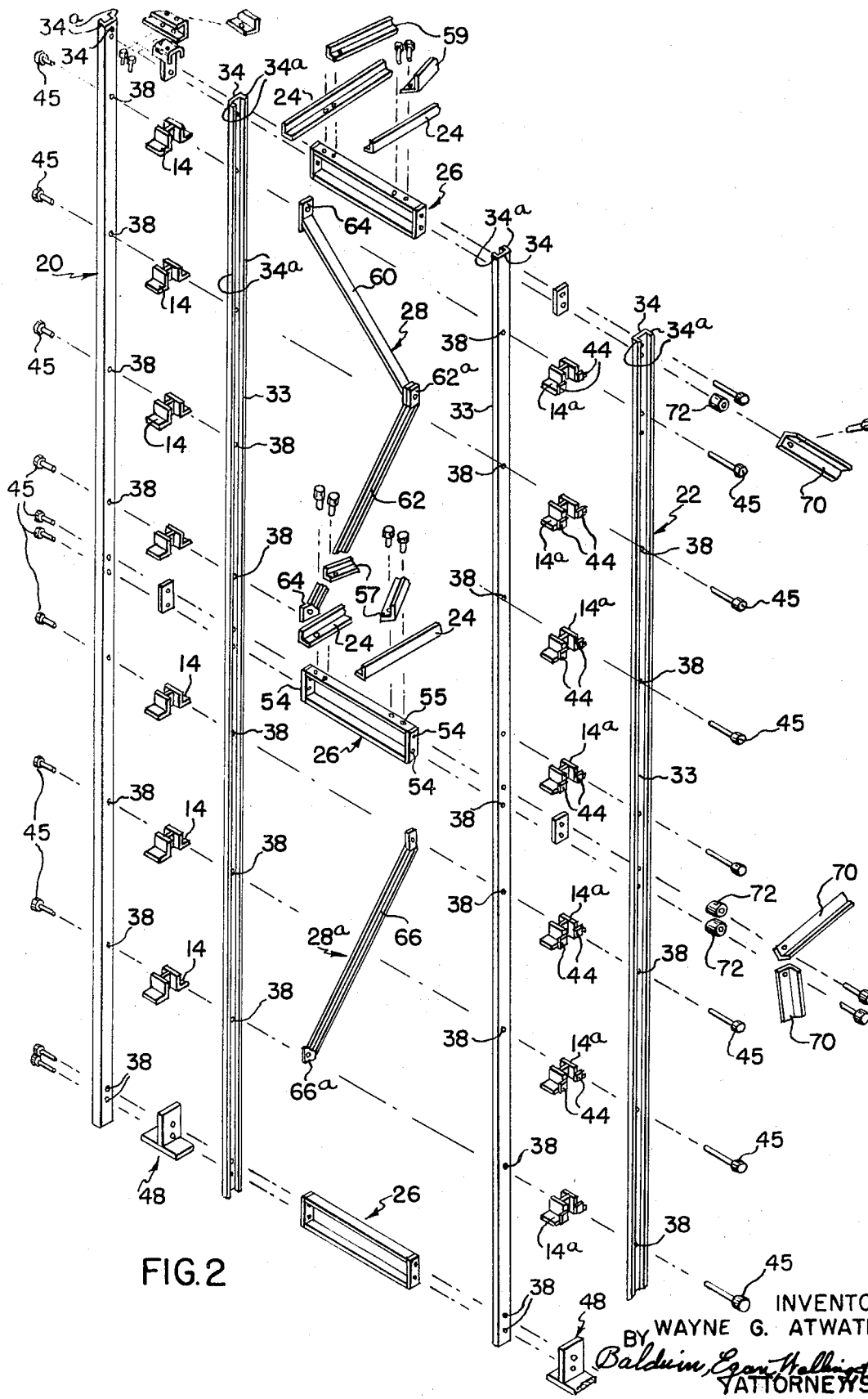
FIG. 2 is a perspective exploded view of various components forming each ladder of the storage rack assembly of FIG. 1.

Referring now again to the drawings, there is illustrated in FIGS. 1 and 2 storage rack sections 8 and 10 defining a plurality of horizontally and vertically arranged storage volumes or bins 12 which are adapted to store loads therein, with the loads disposed in bridging relation across the associated front and rear load carrying members 14, 14a of the respective storage volume. As shown in FIG. 1, there is a storage rack section disposed on opposite sides of a centrally located aisle or travel zone 16 in which an automatic load carrier 18 (FIG. 9) is adapted to move, for handling loads at selected storage bin locations in the storage frame sections.

The components forming the storage frame sections are generally linear in configuration and therefore can be readily fabricated and handled at the factory, and then may be conveniently bundled and shipped to the site of use, where they can be expeditiously assembled into finished storage racks.

Each storage rack section comprises a plurality of spaced travel zone or aisle posts or columns 20 disposed along the travel zone in a row, and a row of longitudinally spaced outer columns or posts 22, with each of the columns in the outer row being generally aligned with a corresponding column in the aisle or travel zone row. Means, such as for instance, longitudinal stringers 24 connect the posts in each row together longitudinally, while other means such as, for instance, spreader members 26 and bracing members 28, 28a connect pairs of posts in opposing rows together. The latter mentioned connected opposing aisle and outer column structure is known in the trade as "ladders" and may hereinafter sometimes be referred to by such term. Also the storage frame sections may be connected together across the travel zone or aisle 16 by means of transverse stringers 30 and reinforcing bracing members 32.

The travel zone column or post 20 and the outer post 22 of each ladder are formed of channel-like members 33 (FIG. 2) having the conventional transverse web 34 and side flanges 34a. Channel-like members 33 may be formed of conventional structural steel channel having the desired strength characteristics for handling the loads adapted to be stored in the storage rack. The channel-like members are punched or drilled lengthwise thereof to provide a series of openings 38 therethrough and as shown in FIG. 2. Assembled with each pair of channel-like members are a plurality of the aforementioned load carrying members 14 or 14a. Load carrying members 14 are adapted for assembly with the travel zone or aisle column 20, while load carrying members 14a are adapted for assembly with the outer column or post 22.

Figure 3:
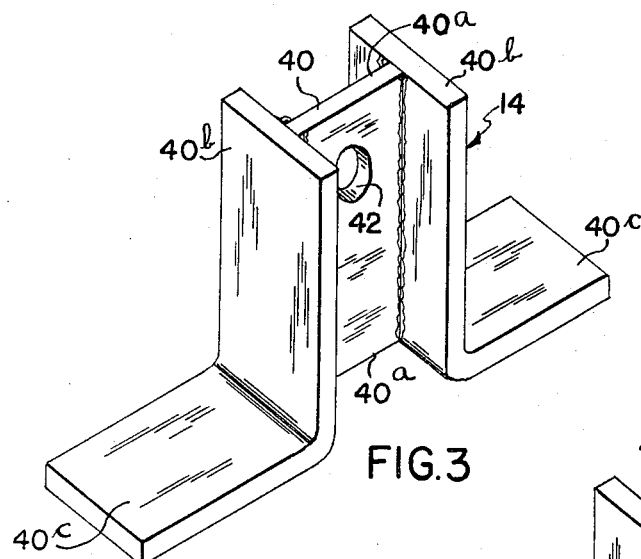
FIG. 3 is an enlarged, perspective view of a load carrying member of the storage rack assembly of FIGS. 1 and 2.
Figure 4:
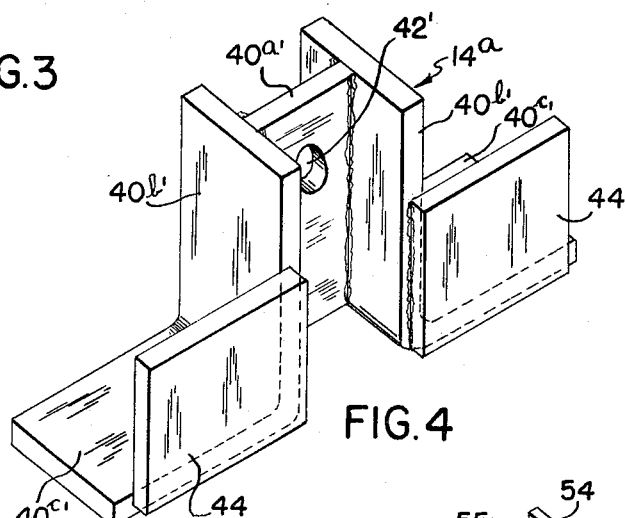
FIG. 4 is an enlarged perspective illustration of another load carrying member of the storage rack assembly of FIGS. 1 and 2.

Referring to FIG. 3, load carrying member 14 comprises a body portion 40 of generally H section in top plan including a generally central web 40a and side flange portions 40b secured as by means of welds to the central web 40a. Projecting laterally outwardly from each side flange portion 40b is a generally horizontally oriented flange portion 40c. Portions 40c are adapted to actually support a load thereon when the load (e.g. L—FIG. 1) is disposed in bridging relationship between laterally oriented load carrying members. An opening 42 is provided through flange portion 40a for a purpose to be hereinafter set forth.

Load carrying member 14a is generally similar to that of load carrying member 14 and therefore the parts thereof have been identified with similar reference numbers except that the suffix prime has been added thereto. However, there is also provided abutment plates or members 44 which are adapted for engagement with a load being handled by the load carrier to prevent the load from moving out the rearward end of the storage volume and in a direction away from the travel zone. Webs 40a and 40a' of members 14 and 14a are each preferably at least one-quarter inch in thickness so that the channel-like members of the respective column are spaced at least one-quarter inch apart in the assembled condition of the storage rack.

As can be best seen in FIG. 2, the web 40a (or 40a' of the load carrying members is adapted to be disposed in generally sandwiched relation between the channel-like members of the respective column and therefore space the channel-like members 33 from one another. This spacing of the channel-like members from one another rigidifies the columns. Also the side flanges 40b or 40b' of each of the load carrying members encompass both channel-like members of the respective column in relatively close relation and materially increase the rigidity of the column. A fastener, such as a bolt and nut or rivet 45 is adapted to pass through aligned openings 38 in the channel-like members and through opening 42 in the respective load carrying member, to fasten the load carrying member to the pair of channel-like members of the respective column. Fastener 45 need be only sufficient to hold the two back-to-back channels together, and take the shear stress of the load on the load carrying member, since the eccentric loads are handled by the moment connection of the nesting of the channel-like members 33 into the load carrying members. Such arrangement materially increases the rigidity of the columns, making them more efficient sections and permitting larger total column loadings as compared to, for instance, rectangular columns.

Figure 5:
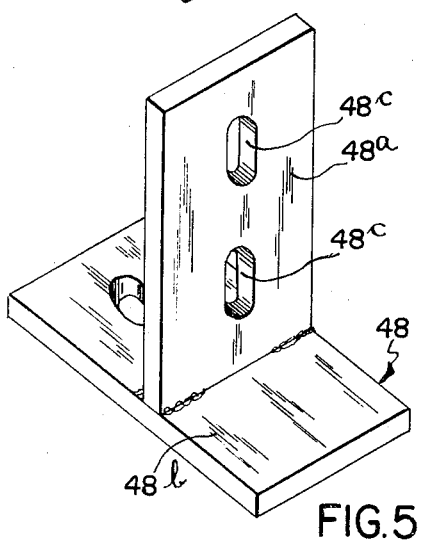
FIG. 5 is an enlarged, perspective illustration of a foot member of the load rack assembly of FIGS. 1 and 2.

Each of the columns is also provided with a foot member 48 (FIGS. 1 and 5) which has a vertically oriented web 48a attached to a generally horizontally oriented bottom plate or web 48b. Web 48a is adapted to be received in sandwiched relation between the channel-like members 33 of the respective column, as shown for instance in FIG. 2, and has elongated openings 48c therein for receiving fasteners such as rivets or bolts and nuts therethrough, for attachment of the foot member to the respective column. Adjustment of the foot member relative to the respective column via the elongated openings 48c is, of course, possible prior to the completion of the fastening operation.

Figure 7:
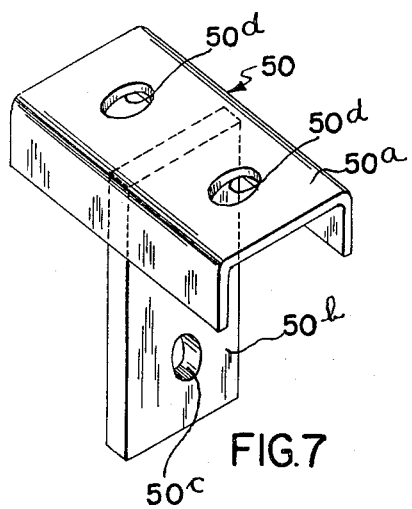
FIG. 7 is an enlarged, perspective view of a top cap member of the load rack assembly of FIGS. 1 and 2.

The travel zone or aisle columns 20 may be provided with top cap members 50 (FIGS. 1 and 7) which include a head member 50a of channel-like configuration depending from which is a central web 50b which is adapted to be received in sandwiched relation between the channel-like members of the respective travel zone column. Web 50b has an opening 50c therethrough through which is adapted to extend a fastener, to secure the top cap member 50 to the respective column. Top cap head 50a of the top cap member is preferably provided with spaced openings 50d therein for convenient attachment of the aforementioned cross bracing 30 and 32 for attaching opposing storage sections together across the travel zone or aisle.

Figure 6:
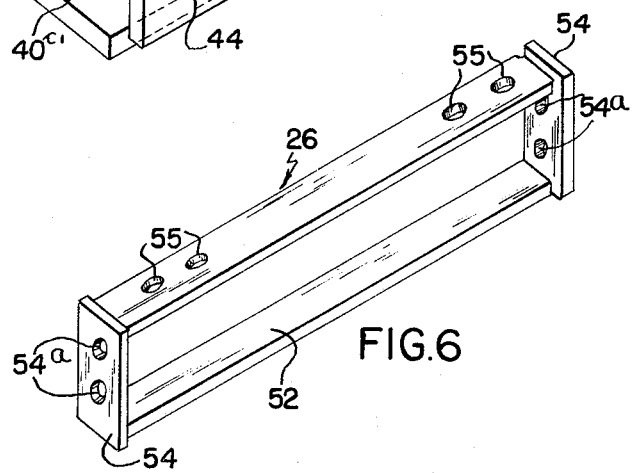
FIG. 6 is an enlarged, perspective illustration of a spreader member of the rack assembly of FIGS. 1 and 2.

FIG. 6 illustrates one of the aforementioned spreader member 26 which are adapted to connect the travel zone and outer columns together into a ladder assembly, and which may be formed from a channel-like section 52 having end plates 54 secured thereto as by means of welds. Plates 54 have openings 54a formed therein adapted to receive therethrough fasteners, such as threaded fasteners or rivets, for attaching the spreader member to the respective column, and wherein the end plates are received between the side flanges 34a of the confronting channel-like member in relatively close fitting relation. Central channel section 52 may also be provided with openings 55 therein for attaching bracing such as, for instance, centrally located bracing 57 and upper bracing 59, as shown in FIG. 1.

Figure 8:
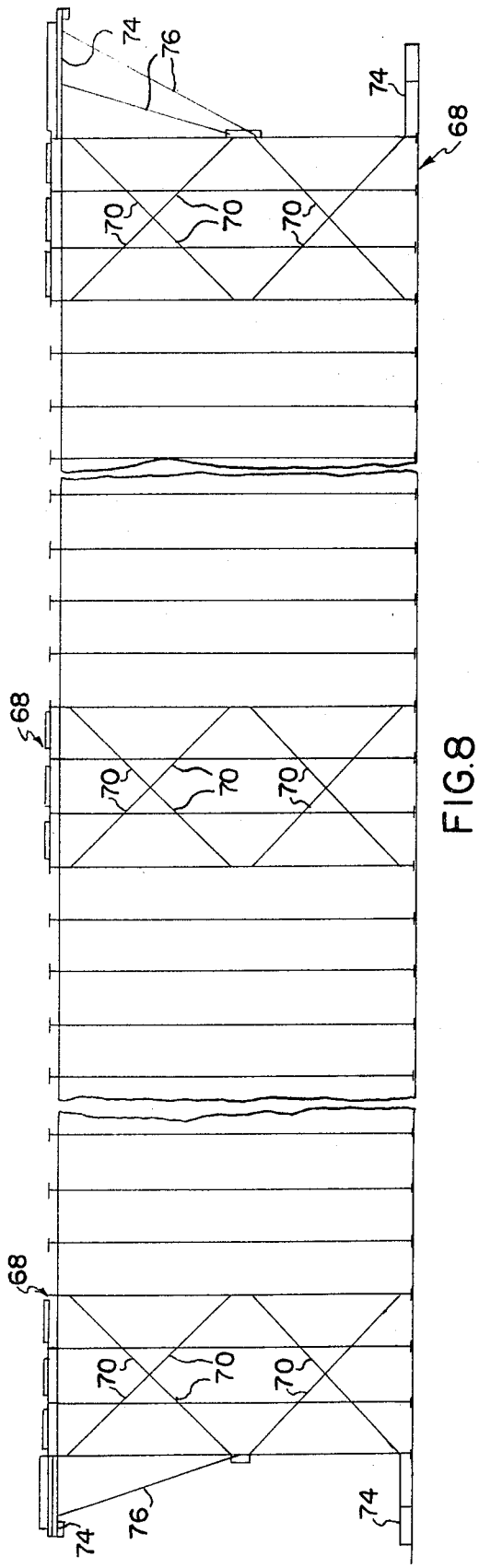
FIG. 8 is a diagrammatic, broken, side elevational view of the load rack assembly illustrating a bracing tower arrangement for the load rack assembly, with a braced tower being disposed at the forward and rearward ends of the storage rack assembly and also generally centrally thereof.
Figure 17:
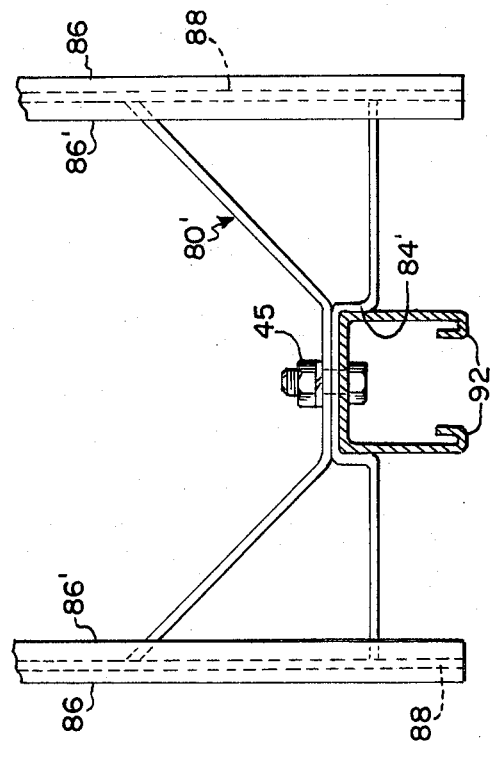
FIG. 17 is an enlarged, fragmentary view taken generally along the plane of line 17—17 of FIG. 16, looking in the direction of the arrows.
Figure 16:
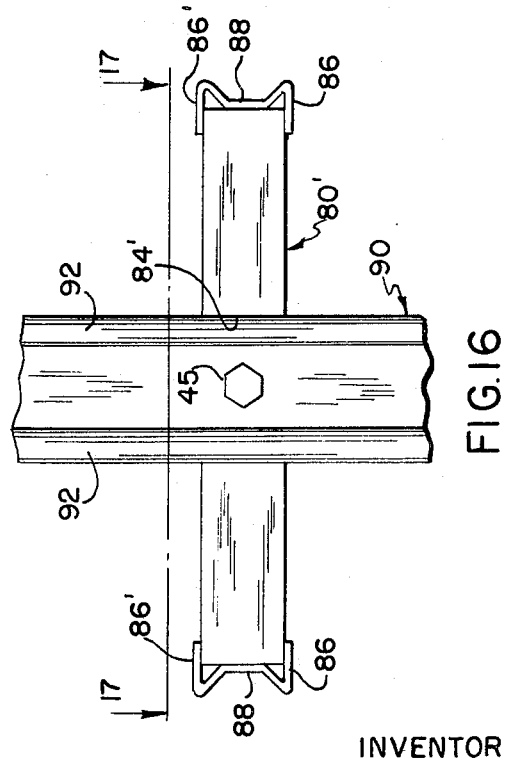
FIG. 16 is an enlarged elevational view taken along line 16—16 of FIG. 15 looking in the direction of the arrows.
Figure 14:
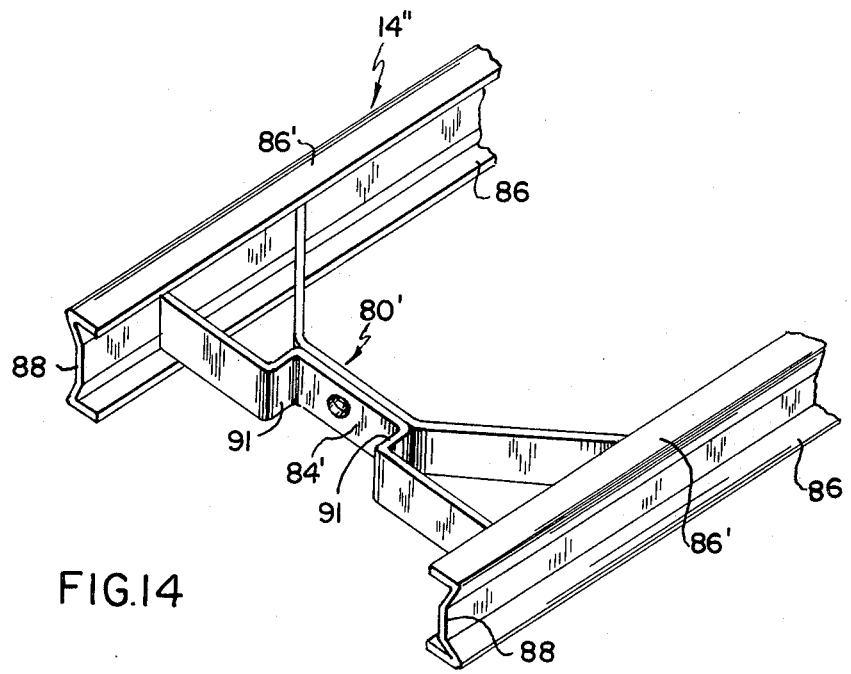
FIG. 14 is an enlarged, fragmentary, perspective view generally similar to FIG. 11, but showing a modified embodiment of K-type load support.
Figure 15:
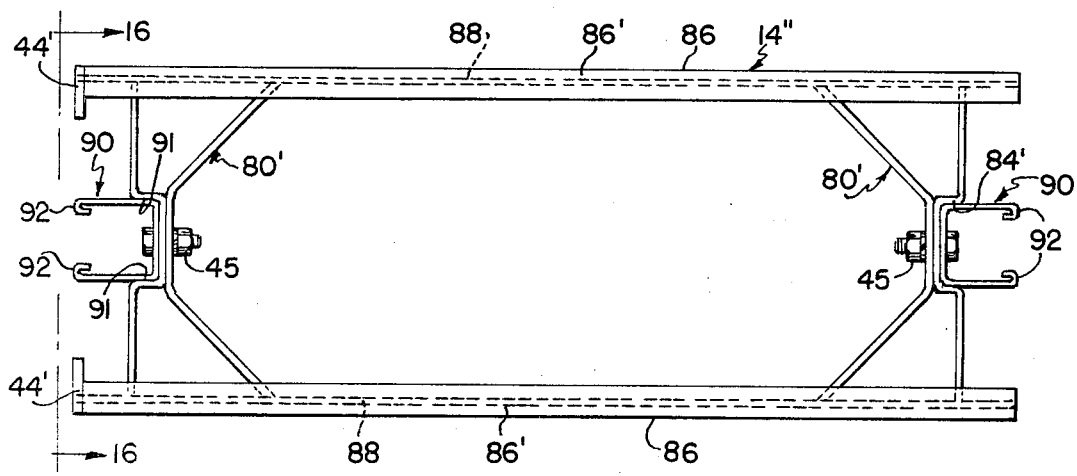
FIG. 15 is a reduced size plan view showing the modified load support of FIG. 14 attached at one end to an aisle column and at its other end to an outer column of the rack.

Each ladder also is preferably rigidified by means of the aforementioned diagonal bracing members 28, 28a. Member 28 is of generally V configuration, formed of elongated members 60, 62 (FIGS. 1 and 2) connected by an apertured plate 62a, which is adapted to be received between the side flanges 34a of the confronting channel-like member 33 of column 22 and in aligned relation with openings 38 therein for being secured to the confronting channel member by means of one of the aforementioned fasteners 45. The distal ends of members 60, 62 have plates 64 secured thereto as by means of welds and which are adapted to be received between the side flanges 34a of the confronting channel-like member 33 of column 20 and in alignment with openings 38 therethrough, for receiving one of the aforementioned fasteners 45. The other bracing member 28a is of a single elongated section 66, having apertured plates 66a fastened to its ends, which are adapted to be received between the side flanges 34a of the respective confronting channel-like member 33 of respectively the associated aisle column 20 and the associated outer column 22. It will be noted that the bracing members 28, 28a may be attached to the confronting columns with the same fasteners, such as for instance bolts 45, that are used for mounting the appropriately spaced front and rear load support members 14, 14a to the respective column. Referring now to FIG. 8, truss tower sections 68 may be embodied in the storage warehousing structure, with each truss tower section 68 being created by a combination of horizontal and vertical internal ladder bracing and being spaced along the length of the rack structure. In the embodiment illustrated, three such truss tower sections are shown. Such sections include diagonal bracing members 70 disposed on the rear or outer face of the storage rack and, as best shown in FIG. 1. MEMBERS 70 are preferably attached to one another where they cross as by means of fasteners, and likewise are attached at the ends of the arms of the diagonal bracing members 70 to the respective outer column 22. As shown in FIG. 2, such end connections may be accomplished by means of an apertured spacer member 72, which is attached as by means of one of the aforementioned fasteners 45 to the respective column for clearing the side flanges 34a of the column. These truss tower sections avoid having to make the exterior bracing members 70 continuous throughout the length of the structure, and yet add substantial rigidity to the rack structure. As shown in FIGS. 8 and 9, the storage rack may have rail structure 74 projecting from its ends on which the load carrier 18 is guided, for positioning the load carrier out of the storage aisle at the ends of the storage rack, and the upper of such projecting rail structure may be provided with diagonal bracing 76.

Referring now to FIGS. 10 through 17, there is illustrated a modified arrangement of load support structure 14'. In this embodiment, the load support structure includes a generally K-like configuration of support web 80, one of which is disposed at either end of the assembly 14' and adapted for coaction with the respective storage rack column 20 and 22. The webs 80 are indented on opposite sides thereof as at 84 (FIGS. 11, 12 and 13) for receiving therein in relatively close relationship an associated channel-like member 33 of the respective column. A fastener, such as a bolt or nut 45 secures the assembly 14' to the respective column. The ends of support web 80 are received into generally channel-shaped load support rails 86 and are secured thereto as by means of welds. The webs 80 may also be suitably attached together as by welds, to form a highly rigid assembly. While the webs 80 are shown diverging from the back-to-back indented portions 84 at an angular relationship of approximately 45°, this angular relationship could be anywhere from approximately 15° to approximately 60°. The prime criteria is that the two K-arms contact the load supporting rails 86 with a greater separation than occurs adjacent the respective column. Rails 86 are adapted to extend the full depth of the respective storage volume as can be seen in FIG. 10. The rearward or outer end of each of the rails may be provided with a stop 44' for preventing movement of a load out the rear end of the storage volume. It will be noted that the rails 86 are of generally tilted M-like configuration in end elevation, which positions the support surface 86' thereof further inwardly toward the central plane of the respective storage volume. The M configuration is preferably generally flattened, as at 88, so as to provide a good attaching surface for connection to the ends of the support web 80. K-like web 80 may be conveniently fabricated from steel strip or plate and provides a highly rigid ladder arrangement connecting the aisle and outer posts 20 and 22 together. As will be seen, a diagonal bracing member 28a may also be provided extending between the aisle and outer posts 20, 22 and being connected at its end by the same fastening means 45 as connects the respective load support assembly 14' to the aisle and outer posts or columns. The load support assemblies 14' can be expeditiously manufactured and rapidly assembled with the columns of the storage rack at the site of use and provide a highly rigid and high strength arrangement.

Referring to FIGS. 14 through 17, there is shown a modified embodiment of the K-like type load support assembly 14''. In this assembly, one side of the central web 80' is again recessed as at 84' similarly to that of the first embodiment except preferably slightly deeper. However, this type of assembly is adapted to be assembled with aisle and outer columns 90 of channel-like configuration of only a single channel. The sides 91 of the recessed portion 84' of each of the webs 80' fit in relatively close relationship the sides of the respective post or column 90, with a suitable fastener means 45 securing the load support assembly to the respective column. The columns or posts 90 may have rolled ends, as at 92, which also provide access into the column for readily attaching the fastener 45 to the column and to the load support assembly 14''. In other respects, this modified arrangement is generally similar to the first described K-like load support arrangement. The advantage of this modified embodiment is that it can be used with a single post or column type of storage rack, which ordinarily costs less to manufacture and to assemble into a storage rack as compared to the back-to-back channel-like arrangement heretofore described.

From the foregoing description and accompanying drawings, it will be seen that the invention provides a novel storage framework or rack for use in an automatic warehousing system, formed from components which are primarily linear components which expedites the manufacture, processing, and handling of the components and the shipping thereof to the location of use where they are adapted for assembly into the finished storage rack. In certain embodiments the storage rack includes columns formed of a pair of channel-like members disposed in spaced back-to-back relation and with load carrying members coupled thereto. The load carrying members each comprise a portion which is disposed in sandwiched relation between the respective pair of channel-like members of the respective column or post and fastening means connect the load carrying members and the posts or columns into an integral assembly. In another embodiment, a K-like type load support assembly is provided for rapid and expeditious assembly with the columns or posts to provide a high strength storage rack for convenient erection at the site of use.

The terms and expressions which have been used are used as terms of description and not of limitation, and there is no intention in the use of such terms and expressions of excluding any equivalents of any of the features shown or described or portions thereof, and it is recognized that various modifications are possible within the scope of the invention claimed.

What is claimed is:

1. In a storage framework for a warehousing system adapted for assembly so as to have a travel zone running alongside said framework for movement of a mechanical load carrier therein operable for depositing loads into and withdrawing loads from the storage framework, said framework defining a plurality of vertically and horizontally arranged storage volumes having open load receiving ends adapted to face the travel zone, said framework comprising generally parallel longitudinal rows of spaced substantially vertical columns including a row of longitudinally spaced travel zone columns adapted for disposal along the travel zone and a row of longitudinally spaced outer columns spaced laterally outwardly respectively from said travel zone columns, at least certain of said columns each comprising a pair of channel-like members with the webs thereof disposed in closely spaced back-to-back relation, means securing said pairs of channel-like members together, means connecting said columns in each row in a longitudinal direction, and a plurality of vertically spaced laterally disposed load carrying members on said columns and defining said storage volumes, said load carrying members which are connected to said certain columns including edgewise disposed web means received in sandwiched relation between the respective pair of back-to-back channel-like members and contacting the latter in generally flat surface-to-surface relation, with the last mentioned web means being connected to the respective pair of back-to-back channel-like members, said web means defining oppositely disposed recesses therein receiving in generally close fitting nesting relation the respective pair of back-to-back channel-like members for rigidifying the latter.

2. A storage framework in accordance with claim 1 wherein each of said load carrying members connected to said certain columns comprises means extending generally perpendicularly laterally from said sandwiched web means to define said recesses, and coacting with the respective channel-like members in encompassing relation.

3. In a storage framework for a warehousing system adapted for assembly so as to have a travel zone running alongside said framework for movement of a mechanical load carrier therein operable for depositing loads into and withdrawing loads from the storage framework, said framework defining a plurality of vertically and horizontally arranged storage volumes having open load receiving ends adapted to face the travel zone, said framework comprising generally parallel longitudinal rows of spaced substantially vertical columns including a row of longitudinally spaced travel zone columns adapted for disposal along the travel zone and a row of longitudinally spaced outer columns spaced laterally outwardly respectively from said travel zone columns, at least certain of said columns each comprising a pair of channel-like members with the webs thereof disposed in closely spaced back-to-back relation, means securing said pairs of channel-like members together, means connecting said columns in each row in a longitudinal direction, and a plurality of vertically spaced laterally disposed load carrying members on said columns and defining said storage volumes, said load carrying members which are connected to said certain columns including edgewise disposed web means received in sandwiched relation between the respective pair of back-to-back channel-like members and contacting the latter in generally flat surface-to-surface relation, with the last mentioned web means being connected to the respective pair of back-to-back channel-like members, and wherein said load carrying members comprise H sections in top plan, said pair of back-to-back channel-like members being received between the arms of the respective H section, the cross portion of said H section comprising said web means and having an opening therethrough aligned with openings through said channel-like members for receiving a fastener means, said fastener means serving to attach the respective load carrying member to said channel-like members.

4. A storage framework in accordance with claim 1 wherein said load carrying members each comprises an H section, in plan, body portion, said channel-like members being received between the side flanges of said H section body portion and with the backs of said channel-like H members being disposed against the cross web of the H section, said cross web comprising said web means and in conjunction with said side flanges defining said recesses, and generally horizontally arranged flange portions projecting laterally from said side flanges for supporting a load in bridging relationship between laterally spaced of said load carrying members.

5. A storage framework in accordance with claim 4 wherein certain of said load carrying members comprise end abutment means on said lateral flange portions for preventing a load being shoved through the respective storage volume in a direction away from said travel zone columns.

6. A storage framework in accordance with claim 4 wherein said load carrying members secured to said outer column include stop means thereon for preventing a load being moved through the respective load volume in a direction away from said travel zone columns.

7. A storage framework in accordance with claim 1 including a foot member including an upright portion disposed in sandwiched relation between said spaced channel-like members of the respective column, and means securing said foot member to said channel-like members.

8. A storage framework in accordance with claim 1 including means extending between and connecting respective of said travel zone and outer columns together, the last mentioned means including an elongated spreader member comprising a channel section and attached end plate sections disposed between confronting of said zone and outer columns, and means securing the spreader member to the respective of said columns, said end plate sections being received between the side flanges of the respective channel-like members of the columns and being secured to the respective cross webs of said channel-like members.

9. A storage framework in accordance with claim 1 including top cap members comprising a depending portion received in sandwiched surface-to-surface relation between the channel-like members of the respective column and a cap portion overlapping the top of the respective column, and means securing the top cap member to the respective column.

10. A storage framework in accordance with claim 1 including diagonal bracing means extending between said zone and outer columns and being received between the side flanges of the confronting channel-like members of the respective columns, and means securing said bracing means to the respective columns.

11. A storage framework in accordance with claim 10 wherein the means securing the diagonal bracing means to the respective columns also secures certain of said load carrying members to the respective column.

12. A storage framework in accordance with claim 1 wherein said load carrying members include elongated portions extending generally horizontally from one end thereof adjacent said zone column to the other end thereof adjacent said outer column to thereby extend for substantially the full depth of the respective storage volume, laterally opposed of said elongated portions being adapted for supporting a load in bridging relation thereacross.

13. A storage framework in accordance with claim 1 wherein one of said framework structures is disposed on each side of said travel zone thus defining an aisle therebetween, and means extending between said framework structures and connecting the latter together across said travel zone.

14. A storage framework in accordance with claim 8 wherein a plurality of said spreader members are provided extending between said zone and said outer columns of each respective pair and including means disposed opposite the ends of the respective spreader member in sandwiched relation between each associated pair of said channel-like members, and fastener means extending between each column and the associated end of said spreader member for securing the respective spreader member and the last mentioned means to the respective columns.

15. A storage framework in accordance with claim 12 wherein said load carrying members each comprises an assembly including K-like frame end portions and elongated load supporting rail members extending between K-like frame end portions, said rail members comprising said generally horizontal elongated portions, each K-like portion comprising said web means and defining said recesses on opposite sides thereof in which said channel-like members are received in relatively snug relation, and fastener means extending between each K-like portion and respective pair of channel-like members for connecting the load carrying assembly to the zone and outer columns.

16. A storage framework in accordance with claim 15 wherein the arms of the K portion extend equally inwardly from the respective column toward the vertical center plane of the respective storage volume.

17. A storage framework in accordance with claim 15 wherein the load supporting rail members are of tipped M-like configuration in end elevation.

18. A storage framework in accordance with claim 1 wherein said framework includes a truss tower section adjacent the forward and rearward ends of said framework, said truss tower section comprising a combination of horizontal, vertical and diagonal bracing.

19. A storage framework in accordance with claim 18 including intermediate truss tower sections between the forward and rearward truss tower sections.

20. A storage framework in accordance with claim 15 wherein said zone and said outer columns are disposed in the respective recess on the exterior side of the respective K-like portion, each of said columns comprising a single channel-like member with the side flanges of the respective channel-like member being received in relatively snug relation in the respective recess, and said fastener means securing the load carrying assembly to each of said single channel-like members.

21. In a storage framework for a warehousing system adapted for assembly so as to have a travel zone running alongside said framework for movement of a mechanical load carrier therein operable for depositing loads into and withdrawing loads from the storage framework, said framework defining a plurality of vertically and horizontally arranged storage volumes having open load receiving ends adapted to face the travel zone, said framework comprising generally parallel longitudinal rows of spaced substantially vertical columns including a row of longitudinally spaced travel zone columns adapted for disposal along the travel zone and a row of longitudinally spaced outer columns spaced laterally outwardly respectively from said travel zone columns, load carrying means extending between each zone and outer column and comprising a load carrying assembly extending for substantially the full depth of the respective storage volumes, said assembly comprising a pair of laterally spaced generally horizontally oriented elongated load carrying members and bracket means extending between and connecting said load carrying members together generally adjacent the ends of the latter, laterally opposed of said load carrying members in each storage volume being adapted for supporting a load in bridging relation thereacross, said bracket means comprising spaced K-like, in plan, support frames each of which is connected at its opposite ends to respective of said load carrying members and connected at its central portion to the respective of said columns, said central portion of each of said bracket means comprising an outwardly facing recess therein in which the respective column is received in relatively snug, at least partially encompassed relation, fastener means coacting between the respective column and said central portion of each bracket means for securing said load carrying assembly to the respective zone and outer columns, and wherein the diagonal arms of each K-like support frame extend diagonally inwardly, relative to said load carrying assembly, from said central portion, and in a direction away from the respective end of said load carrying assembly.

22. A storage framework in accordance with claim 21 wherein the included angle between certain of the arms of the K-like bracket means is within a range of approximately 15° to 60°.

23. A storage framework in accordance with claim wherein each of said columns comprises a single channel-like member, the cross web of said single channel-like member being secured to a respective of said bracket means by said fastener means.

* * * * *